Jan. 8, 1963 C. H. MacFARLAND 3,072,342
LIQUID SPRAYER
Filed Nov. 22, 1960 3 Sheets-Sheet 1

INVENTOR.
CHARLES H. MacFARLAND
BY Evans & Learne
Attorneys

Jan. 8, 1963     C. H. MacFARLAND     3,072,342
LIQUID SPRAYER
Filed Nov. 22, 1960     3 Sheets-Sheet 2

INVENTOR.
CHARLES H. MacFARLAND
BY
Attorneys

Jan. 8, 1963     C. H. MacFARLAND     3,072,342
LIQUID SPRAYER

Filed Nov. 22, 1960     3 Sheets-Sheet 3

INVENTOR.
CHARLES H. MacFARLAND
BY
Attorneys

United States Patent Office 3,072,342
Patented Jan. 8, 1963

3,072,342
LIQUID SPRAYER
Charles H. MacFarland, Rocky River, Ohio, assignor to
The Scott & Fetzer Company, Cleveland, Ohio, a corporation of Ohio
Filed Nov. 22, 1960, Ser. No. 71,059
4 Claims. (Cl. 239—354)

This invention relates to a liquid sprayer which is suitable for use with an air supply comprising a continuous flow of low pressure air such as issues from a hose attached to the pressure side of a vacuum cleaner.

Liquid sprayers may be classified into two general types based upon the air supply. In one type, the air supply is maintained under high pressure with a compressor or similar device, and the air line may be completely shut off for indefinite periods without damaging the air supply system. In the other type, the air supply is a continuous flow of low pressure air such as is produced by a vacuum cleaner.

Vacuum cleaner sprayers are customarily designed to maintain a continuous flow of air at all times with the spraying operation depending on the diversion of a portion of the air therefor. Such air may be directed into a container of liquid attached to the sprayer. This increases the pressure in the container and causes liquid to be forced up through a pipe or tube which terminates in a nozzle positioned within a central zone of the air flow to effect the desired spray of liquid.

Another problem with vacuum cleaner sprayers is that they are not readily adaptable to varied spraying conditions and particularly applications in which close control of the spray pattern is essential.

The liquid sprayer of the present invention overcomes many of the difficulties encountered with previous low pressure, continuous flow sprayers. For example, the sprayer of the invention provides a greater degree of control of the spray pattern issuing from the sprayer than was heretofore attainable with low pressure, continuous flow sprayers. In addition, the sprayer is simple in construction and may be disassembled easily and conveniently thereby providing ready access to the various parts for cleaning. Also, the sprayer of the invention provides improved control of the liquid flow as compared with previous low pressure, continuous air flow sprayers.

Other features and advantages of the invention will be apparent from the following description and drawings in which.

Figure 1:
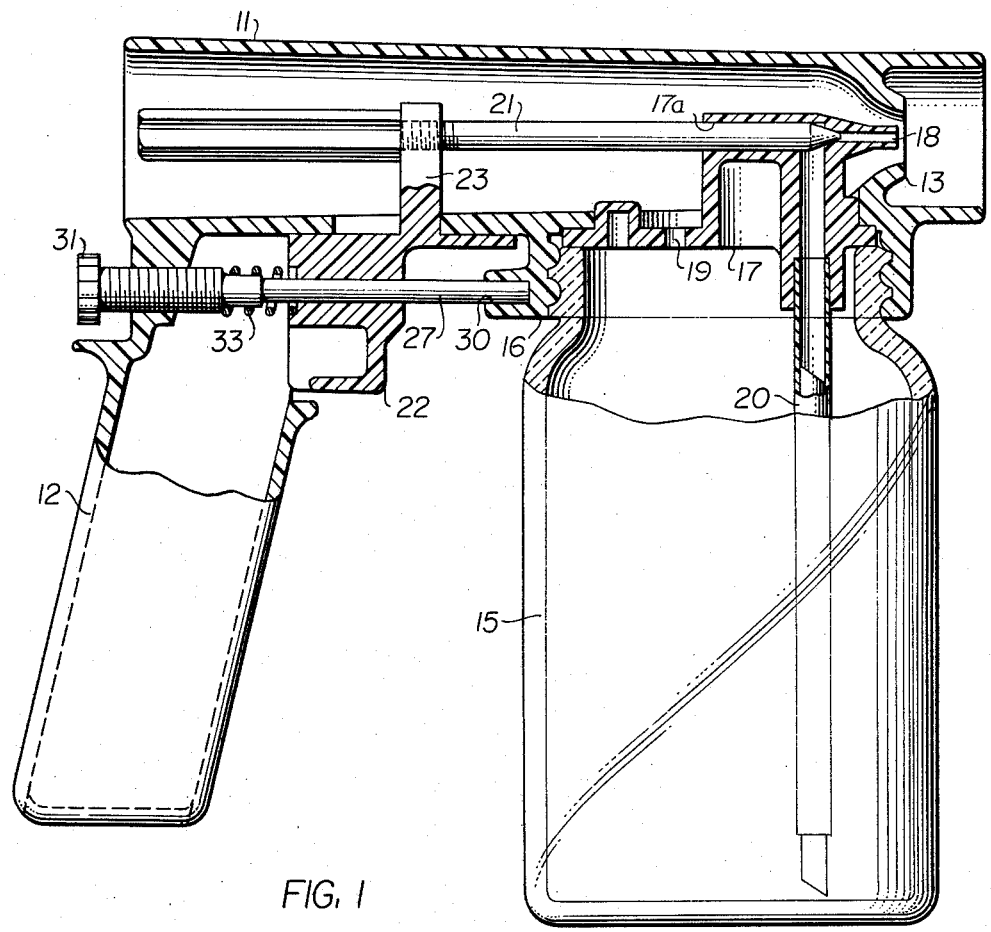
FIGURE 1 is a partially sectioned side elevation of a sprayer of the invention.

As shown in the drawings, a liquid sprayer of the invention comprises a sprayer body 11 having a handle 12. The sprayer body 11 has an air passage extending therethrough with the rear portion of the passage being open to receive an air supply hose such as a vacuum cleaner hose. The forward portion of the passage is constricted by a tapered inner wall 13 disposed within the body.

A liquid container 15 is attached to the sprayer body 11, for example, by attachment to a threaded portion 16 of the body.

Disposed within the air passage of body 11 and above container 15 is a valve member 17 having a passage therein which communicates with a discharge nozzle 18 and a liquid-conducting tube 20. The discharge nozzle 18 of member 17 is located so that it is in proximity to the constricted forward portion of the air passage created by tapered inner wall 13 of the body 11. The discharge nozzle 18 advantageously is centrally disposed with respect to the constricted forward portion of the air passage. Valve member 17 also has an opening 19 which connects the air passage of body 11 with container 15.

A valve plunger 21 is positioned within the air passage of body 11 with the forward portion of the plunger in contact with and supported by the valve member 17. Advantageously, valve member 17 has a rearwardly extending portion 17a which supports the plunger while permitting it to freely slide longitudinally so that the forward portion of plunger 21, which may be tapered, will seal the liquid-carrying passage through member 17 and thereby prevent the flow of liquid from the nozzle 18.

Plunger 21 is attached to a trigger 22 which, as shown in the drawing, may be a threaded attachment. Trigger 22 is positioned outside of body 11 except for a stud 23 which extends into the air passage of the body through a slot 25. The stud 23 of trigger 22 has an opening 26 in which plunger 21 is disposed and suitably secured to maintain the plunger properly positioned with respect to the valve member 17.

Trigger 22 is retained in position against the sprayer body by means of a shaft 27 which extends through aperture 28 of trigger 22 and into an opening 30 adjacent to the container receiving portion 16 of body 11. The opposite end of shaft 27 is held in place by the hollow portion of screw 31 which receives this end of shaft 27.

As shown, a spring 33 surrounds shaft 27 and bears against trigger 22 and the shouldered inner portion of screw 31 to press against trigger 22 and maintain it in a forward position so that plunger 21 attached thereto will be positioned to close the passage of valve member 17.

In the operation of the sprayer, a liquid is placed in container 15 and the rear opening of body 11 is attached to a suitable supply of continuously flowing low pressure air such as is expelled from the pressure opening of a vacuum cleaner. Upon starting the vacuum cleaner motor, air flows through the air passage of body 11 past the tapered wall portion 13 and out the front of the sprayer. A portion of the air flowing through the air passage is diverted into container 15 through opening 19 connecting the air passage with the container. The air entering container 15 increases the pressure against the surface of the liquid in the container forcing a portion of the liquid up tube 20 and into valve member 17. The liquid is prevented from being discharged from nozzle 18 by the sealing action of plunger 21 across the passage through valve member 17.

When a spray is desired, manual pressure is applied to trigger 22 to move it longitudinally rearwardly to cause plunger 21 attached thereto to be displaced along its own axis longitudinally with respect to the passage in valve member 17 thereby permitting liquid to be discharged from nozzle 18. While the fit between plunger 21 and valve member 17 permits sufficient clearance so that the plunger may freely slide within the valve member, the liquid does not flow rearwardly through portion 17a of valve member 17 due to the continuous flow of air toward the outlet of the body 11.

The continuous flow of air moving through the air passage of body 11 mixes with the liquid discharged from nozzle 18 forming a spray which issues from the front opening of the body. When it is desired to stop the spray, trigger 22 is released causing spring 33 bearing against it to move the trigger forward into its original position thus causing plunger 21 to reseal the passage in valve member 17 and stop the flow of liquid therethrough.

The fineness or coarseness of the spray droplets may be adjusted by controlling the extent of rearward movement of plunger 21. This movement is controlled by screw 31. As the screw is advanced into body 11, the distance is decreased between the forward position of the trigger 22 and the end portion of screw 31 against which it abuts when it is moved along shaft 27 to its rearward position. Since plunger 21 is attached to trigger 22, the adjustment of the distance which the trigger may move, determines the extent which the plunger may be moved with respect to the passage in the valve member 17.

To facilitate cleaning of the portions of the sprayer which have come in contact with the liquid being employed, valve member 17 is advantageously made as a separate part of the sprayer as shown in the drawings. As shown, the sprayer may be disassembled simply and conveniently by removing plunger 21 from engagement with valve member 17 and trigger 22 and also removing container 15 from the threaded portion of the body. This permits valve member 17 to be withdrawn from body 11. Removal of valve member 17 provides access to the interior of body 11 and permits the cleaning of tapered portion 13. Plunger 21 and valve member 17 may be cleaned as desired. If required, trigger 22 may also be removed from body 11 by removing screw 31 from the body and withdrawing the trigger-supporting shaft 27.

Conversely, the sprayer may be reassembled by placing trigger 22 into its proper position, sliding shaft 27 through spring 33 and trigger 22 until the forward end of the shaft engages opening 30 in body 11, and fastening screw 31 to the body to secure the trigger assembly. Valve member 17 may be inserted into its proper position within the air passage of body 11 and the liquid container 15 attached to the body. When the valve member 17 is made of a suitable plastic, it is usually not necessary to employ a sealing gasket between the container 15 and the valve member although, if desired, a suitable gasket may be utilized. Plunger 21 then may be inserted into the rear opening of the air passage and the forward portion thereof advanced through the threaded opening 26 in stud 23 of the trigger and into the opening of the rearwardly extending portion 17a of the valve member. The plunger 21 is maintained in its proper position by its threaded engagement with the stud 23.

Figure 2:
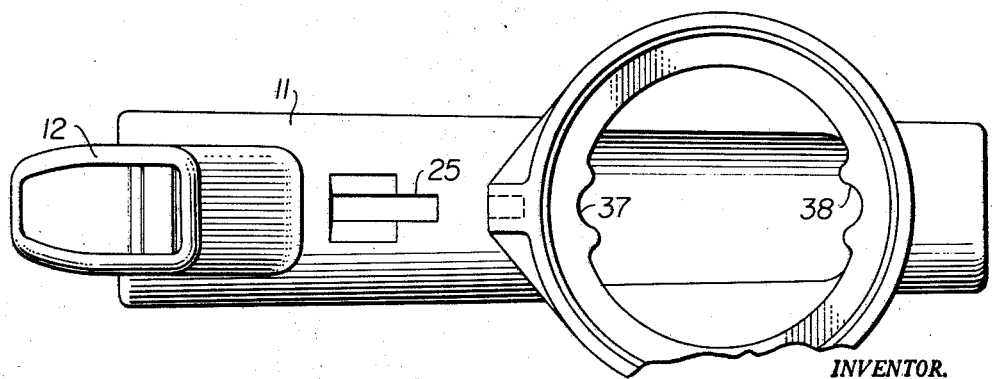
FIGURE 2 is a view from below of the body portion of the sprayer of FIGURE 1.
Figure 3:
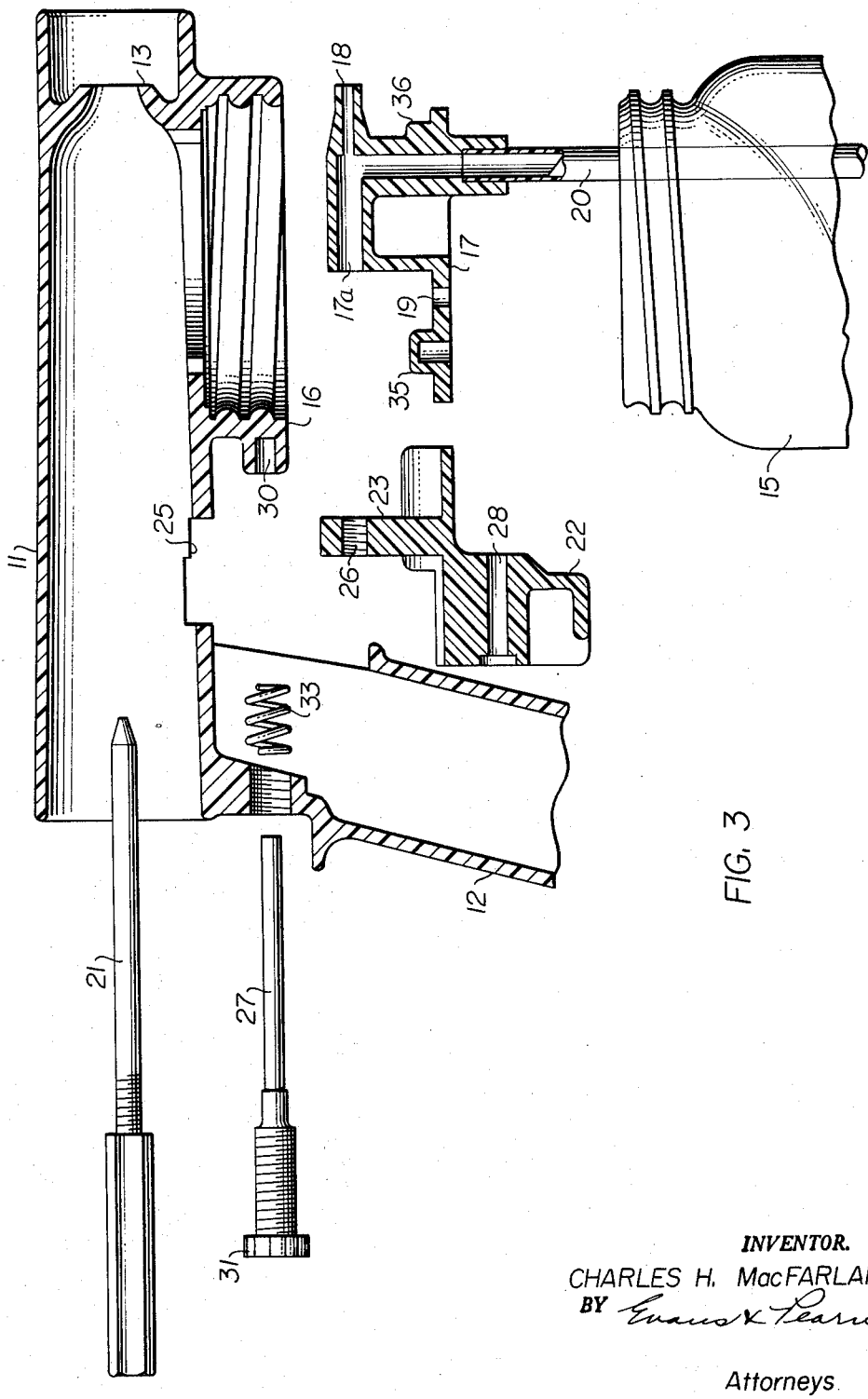
FIGURE 3 is an exploded view partly in section of the sprayer.
Figure 4:
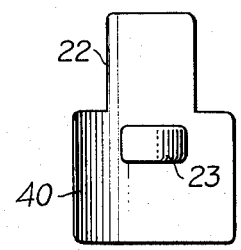
FIGURE 4 is a plan view of the trigger mechanism of the sprayer shown in FIGURE 3.
Figure 5:
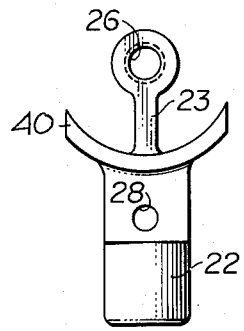
FIGURE 5 is a front elevation of the trigger mechanism shown in FIGURE 4.
Figure 6:
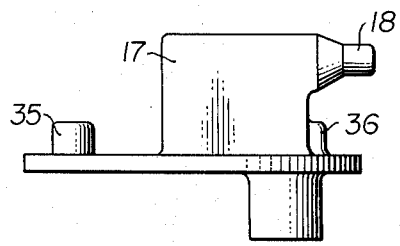
FIGURE 6 is a side elevation of the valve member of the sprayer shown in FIGURE 1 without the liquid conducting tube.
Figure 7:
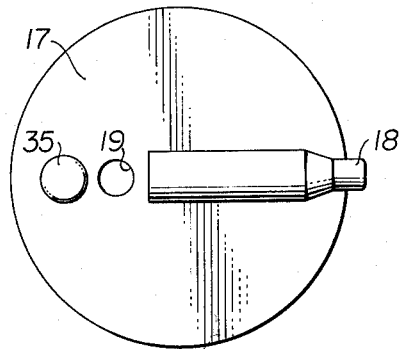
FIGURE 7 is a plan view of the valve member shown in FIGURE 6.

To facilitate the proper alinement of valve member 17 within the air passage of body 11, member 17 may be provided with a pair of indexing bosses 35 and 36 which engage respectively cutout portions 37 and 38 in body 11 as shown in FIGURES 2 and 3 of the drawings.

Advantageously, as shown in the drawings, trigger 22 has a curved skirt portion 40 to cover slot 25 through which the stud 23 of the trigger is inserted. The skirt portion is preferably of sufficient size to cover the slot opening 25 whether the trigger is in a forward or rearward position. This minimizes the amount of air which otherwise would be lost through slot 25 thereby reducing the effective air pressure flowing through the sprayer.

When it is desired to form a foam or lather using the sprayer of the invention such as when cleaning rugs or upholstered furniture, suitable devices or attachments may be placed across the front part of the air passage at a point ahead of nozzle 18. Attachments of this kind are well known and may take the form of cloth or metal screens or porous fibrous disks or caps.

The simplicity of the various parts of the sprayer of the invention permits the assembly of a sprayer substantially entirely of parts made of plastics and particularly, molded polypropylene. Thus, another advantage of the sprayer of the invention is that it may be produced at a relatively low cost while providing the features of more expensive sprayers.

From the above discussion, it will be seen that the sprayer of the present invention not only overcomes many of the difficulties encountered with previous low pressure, continuous air flow sprayers suitable for use with vacuum cleaners, but also the sprayer of the invention provides a greater degree of control of the spray pattern than was heretofore attainable with such sprayers. In addition, the sprayer of the invention is simple in construction and may be disassembled easily and conveniently to facilitate cleaning of the sprayer after use. An additional advantage of the sprayer of the invention is that it provides more positive control of the spraying operation than vacuum cleaner sprayers heretofore employed.

It is apparent from the above discussion that various modifications of the particular sprayer described in detail may be made within the scope of the invention. For example, the arrangement and particular configuration of the various parts may be modified without affecting the operation of the sprayer. Therefore it is not intended that the invention be limited to the particular sprayer construction disclosed in detail herein, except as may be required by the appended claims.

What is claimed is:

1. A liquid sprayer to be employed with a low pressure, continuous flow air supply comprising a sprayer body having a substantially straight air passage therethrough, said passage having an open rear portion and a constricted forward portion, a liquid container attached to said body, a liquid discharge nozzle positioned within the air passage of said body in proximity to the constricted forward portion of said air passage, a liquid carrying tube connected to said nozzle and extending into said liquid container to permit the flow of liquid from said container to said nozzle, a valve plunger longitudinally positioned within the air passage of said body and spaced a substantial distance from said body with the forward portion of said plunger in contact with said nozzle, a trigger attached to said plunger to provide manual longitudinal reciprocation of said plunger within said air passage with respect to said nozzle, spring means maintaining said plunger in releasable contact with said nozzle, an opening in said sprayer body connecting the air passage thereof with said liquid container so that a portion of the air flowing through said air passage will be diverted into said container forcing liquid therein up through said liquid carrying tube whereby actuating said trigger will displace said plunger longitudinally thereby causing liquid to be discharged from said nozzle.

2. A liquid sprayer to be employed with a low pressure, continuous flow air supply comprising a sprayer body having a substantially straight air passage therethrough, said passage having an open rear portion and a constricted forward portion, a liquid container attached to said body, a liquid discharge nozzle positioned within the air passage of said body in proximity to the constricted forward portion of said air passage, a liquid carrying tube connected to said nozzle and extending into said liquid container to permit the flow of liquid from said container to said nozzle, a valve plunger longitudinally positioned within the air passage of said body and spaced a substantial distance from said body with the forward portion of said plunger in contact with said nozzle, a trigger attached to said plunger to provide manual longitudinal reciprocation of said plunger within said air passage with respect to said nozzle, a trigger shaft on which said trigger slides in substantially parallel relation to said plunger, means for adjusting the travel of said triger on said shaft, a spring disposed on said shaft to maintain said trigger in a forward position and thereby maintain said plunger in releasable contact with said nozzle, an opening in said sprayer body connecting the air passage thereof with said liquid container so that a portion of the air flowing through said air passage will be diverted into said container forcing liquid therein up through said liquid carrying tube whereby actuating said trigger will displace said plunger longitudinally thereby causing liquid to be discharged as a spray.

3. A liquid sprayer to be employed with a low pressure, continuous flow air supply comprising a sprayer body having a substantially straight air passage therethrough, said passage having an open rear portion and a constricted forward portion, a liquid container attached to said body, a valve member having a discharge nozzle and a liquid carrying tube, said valve member being positioned within the air passage of said body with the discharge nozzle of said member being in proximity to and axially aligned with the constricted forward portion of said air passage, the liquid carrying tube of said valve member extending into said liquid container to permit the flow of liquid from said container to said discharge nozzle, a valve plunger longitudinally positioned within the air passage of said body and spaced a substantial distance from said body with the forward portion of said plunger in contact with said valve member, a trigger attached to said plunger to provide manual longitudinal reciprocation of said plunger with respect to said nozzle in said valve member and within said air passage, spring means maintaining said plunger in releasable contact with said valve member, an opening in said valve member connecting the air passage with said liquid container so that a portion of the air flowing through said air passage will be diverted into said container forcing liquid therein through the liquid carrying tube of said valve member whereby actuating said trigger will displace said plunger longitudinally with respect to said valve member thereby causing liquid to be discharged as a spray.

4. A liquid sprayer to be employed with a low pressure, continuous flow air supply comprising a sprayer body having a substantially straight air passage therethrough, said passage having an open rear portion and a constricted forward portion, a liquid container attached to said body, a valve member having a discharge nozzle and a liquid carrying tube, said valve member being positioned within the air passage of said body with the discharge nozzle of said member being in proximity to and axially aligned with the constricted forward portion of said air passage, the liquid carrying tube of said valve member extending into said liquid container to permit the flow of liquid from said container to said discharge nozzle, a valve plunger longitudinally positioned within the air passage of said body and spaced a substantial distance from said body with the forward portion of said plunger in contact with said valve member, a trigger attached to said plunger to provide manual longitudinal reciprocation of said plunger in said valve member and within said air passage, a trigger shaft on which said trigger slides in substantially parallel relation to said plunger, means for adjusting the travel of said trigger on said shaft, a spring disposed on said shaft between said trigger and said adjusting means to maintain said trigger in a forward position and thereby maintain said plunger in releasable contact with said valve member, an opening in said sprayer body connecting the air passage thereof with said liquid container so that a portion of the air flow flowing through said air passage will be diverted into said container forcing liquid therein through the liquid carrying tube of said valve member whereby actuating said trigger will displace said plunger longitudinally with respect to said valve member thereby causing liquid to be discharged as a spray.

References Cited in the file of this patent

UNITED STATES PATENTS

| | | |
|---|---|---|
| 1,744,208 | Buchanan | Jan. 21, 1930 |
| 1,809,073 | Schylander | June 9, 1931 |
| 2,576,669 | Bramhall | Nov. 27, 1951 |
| 2,595,317 | White | May 6, 1952 |
| 2,610,895 | Stone | Sept. 16, 1952 |
| 2,675,147 | Odom | Apr. 13, 1954 |
| 2,868,585 | Esser | Jan. 13, 1959 |